April 7, 1964 W. KNEEN ETAL 3,127,762
CHROMATOGRAPHY
Filed March 23, 1961 3 Sheets-Sheet 3

3,127,762
CHROMATOGRAPHY
William Kneen, Glendora, and William E. Fisher, Rosemead, Calif., assignors to Consolidated Electrodynamics Corporation, Pasadena, Calif., a corporation of California
Filed Mar. 23, 1961, Ser. No. 97,855
3 Claims. (Cl. 73—23)

This invention relates to a chromatographic analysis system for effecting a chromatographic separation of a selected one of a plurality of sample streams and monitoring selected peaks in the stream so separated.

Chromatographic separation is now a well-known analytical process, although its commercial acceptance has become widespread only in recent years. Various methods for effecting chromatographic separation exist. The method most commonly used at present is that of adsorption in a system utilizing a sample in the form of a vapor. The sample may either be a vapor under ambient conditions or may be vaporized prior to introduction into the chromatographic column. The introduction into the column is commonly accomplished through the utilization of a suitable elutant or carrier gas. In the resultant separation, various components of the sample are spatially separated by a process of selective adsorption and desorption by the column packing, so that the components of a sample introduced into one end of the column will emerge from the opposite end in a sequence which is related to the rate of adsorption and desorption of each.

Components emerging from the column are conventionally passed through some type of detector, the output of which consists of a series of time-separated indications corresponding to the presence of the various separated components. Preferably, the amplitudes of the indications are functions of the amounts of the substances in the sample. For example, using a conventional thermal detector, the output of which is an electrical signal, the amplitude of the signal will be indicative of the quantity of component, and the time relationship of the signal will be indicative of the composition of the component. These signals may then be applied to a suitable indicator, such as a conventional strip chart recorder, to provide a visual record of the complete analysis of the sample as performed by the chromatographic separation.

In such a system, the amplitudes of the output signals corresponding to the different components may vary quite widely, since the amplitudes will be related not only to the quantity of a component, but also to its thermal conductivity. Thus it may be desirable to adjust the various amplitudes to standard levels indicating a known composition of sample, so that a variation in amplitude from this level will correspond to a deviation in sample composition from the desired composition. A system for accomplishing such an adjustment of amplitudes is described in U.S. Patent No. 2,875,606, of Charles F. Robinson, issued March 3, 1959, and assigned to Consolidated Electrodynamics Corporation, the assignee of the present application. Therein is described a system for separating and attenuating the amplitudes of the different components by their application to selected ones of a plurality of potentiometers. The potentiometer outputs are adjusted in accordance with the particular components applied thereto so as to provide the desired peak amplitude for recording.

According to the present invention the one of a plurality of sample streams is selectively applied to a chromatographic column to initiate a chromatographic separation of the sample. The separated components issuing from the chromatographic column are then passed through a detector, the output of which is an electrical signal having peaks corresponding to the particular components detected. The selected ones of these peaks are applied to an indicator such as a recorder, and preferably subjected to variable attenuation prior to such application. A diode matrix and switching system is utilized to select the desired one of the sample streams.

The invention may be more readily understood by referring to the accompanying drawings in which:

FIGURE 4 is a block diagram of a variable attenuation system for utilization with the system of FIGURE 1.

Figure 1:
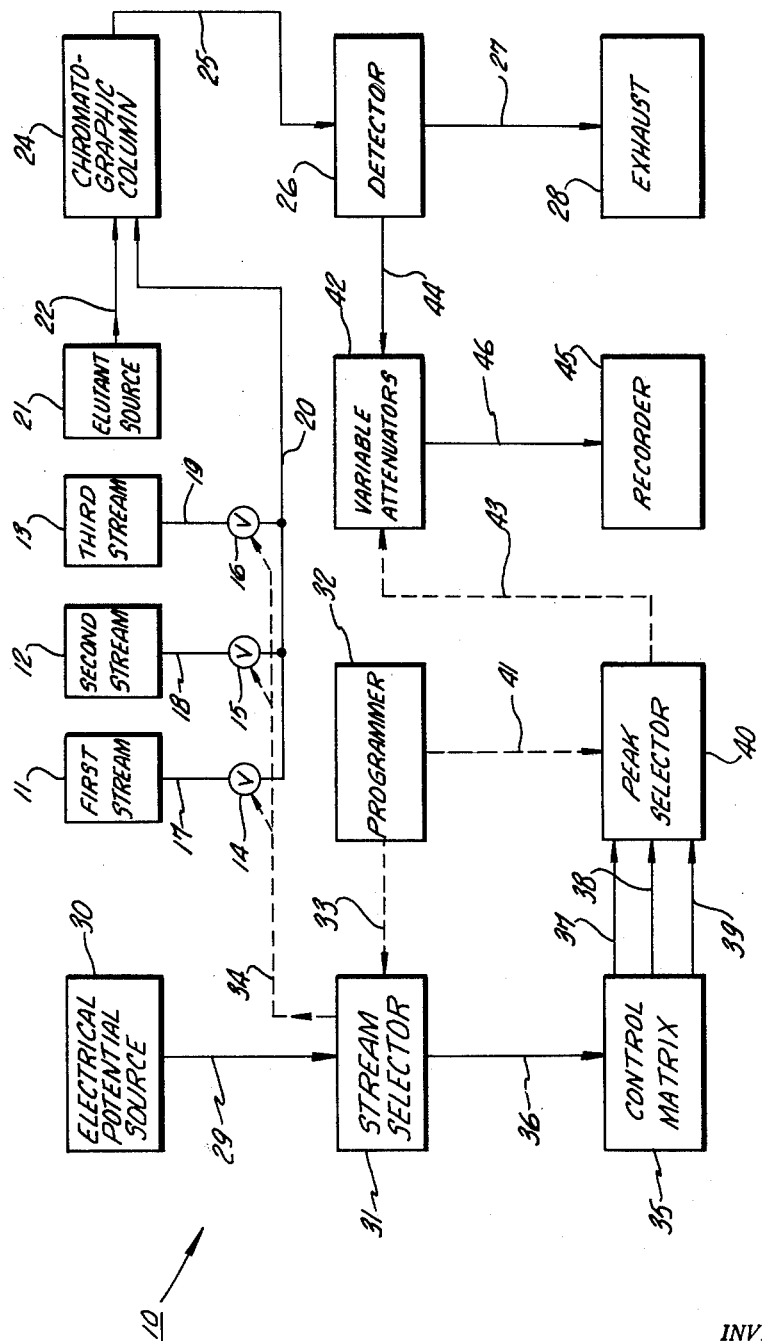
FIGURE 1 is a block diagram of a chromatographic system according to the invention.

Referring now to FIGURE 1, there is shown a block diagram of a chromatographic system 10, a plurality of sample sources illustrated by way of example as a first stream 11, second stream 12, and third stream 13, which are connected to on-off control valves 14, 15 and 16, respectively, by stream lines 17, 18 and 19. The control valves 14, 15, and 16 are connected to a sample inlet line 20. An elutant source 21 is connected to an elutant inlet line 22. The sample inlet line 20 and elutant line 22 are connected to a chromatographic column 24. The column 24 has an outlet line 25, through which the separated components issue and are applied to a chromatographic detector 26, which may be, for example, of the conventional thermal conductivity type. Other types of detectors may be utilized which provide an output which is an electrical signal having peaks related to the chromatographically separated substances. After passing through the detector 26, the chromatographically separated components and elutant pass through an outlet line 27 and into an exhaust 28. The exhaust 28 may consist of a venting of the substances to the atmosphere, a separate storage for the various components, or a return of the components to the appropriate source from which the sample was originally obtained.

An electrical potential source 30 applies an electrical potential to a stream selector 31 through a lead 29. The electrical potential source may be either an A.C. or D.C. source, although, for purposes of convenience, a D.C. source will be assumed in the subsequent description. A programmer 32 controls the stream selector, as is indicated by the dotted line 33. The stream selector has a control output, indicated by the dotted line 34, which is applied to the inlet valves 14, 15 and 16 to control the opening and closing thereof. The valves 14, 15 and 16 may, for example, be of the conventional solenoid actuated type, in which the valve is opened briefly upon the application of an electrical potential and reset by the removal of this potential. In such a system the dotted line 34 corresponds to a separate electrical lead connected to each of the valves 14, 15, and 16.

The stream selector 31 also applies an electrical potential to a diode control matrix 35 through a lead 36. The matrix 35 is illustrated as having three output leads 37, 38, and 39, which are connected to a peak selector 40. It should be understood that only three leads 37, 38, and 39 are shown in order to simplify the drawing, and that any number of leads may be utilized, as will become apparent with respect to FIGURE 3. The programmer 32 also applies a control, indicated as the dotted line 41, to the peak selector 40 to control the selection of the various attenuation ranges, to which the output of the detector is subjected by means of variable attenuators 42. The output of the peak selector is applied to the variable attenuators 42, as is indicated by the dotted line 43. The electrical signal output of the detector 26 is connected to the variable attenuators 42 by a lead 44. The output of the variable attenuators 42 is connected by a lead 46 to a recorder 45, which may be a strip recorder or any other appropriate indicating device.

In operation, the programmer 32 is actuated to cause the stream selector 31 to apply an electrical potential to the appropriate stream inlet control valves 14, 15, and 16 to cause a sample to be introduced into the column 24. The programmer also actuates the peak selector 40 to cause the control potentials 37, 38, and 39 to be applied to a selected ones of the variable attenuators 42 in a predetermined time sequence. The chromatographically separated components issue from the chromatographic column 24 and pass through the detector 26 in sequence, causing a detector output to occur which consists of a series of electrical signal peaks occuring in a time sequence related to the chemical identity of the components. The amplitudes of the peaks are attenuated as desired by their application to selected ones of the variable attenuators 42. The attenuated output signals are applied to the recorder 45 so as to present an indication, preferably visual, of the composition of the sample separated.

Figure 2:
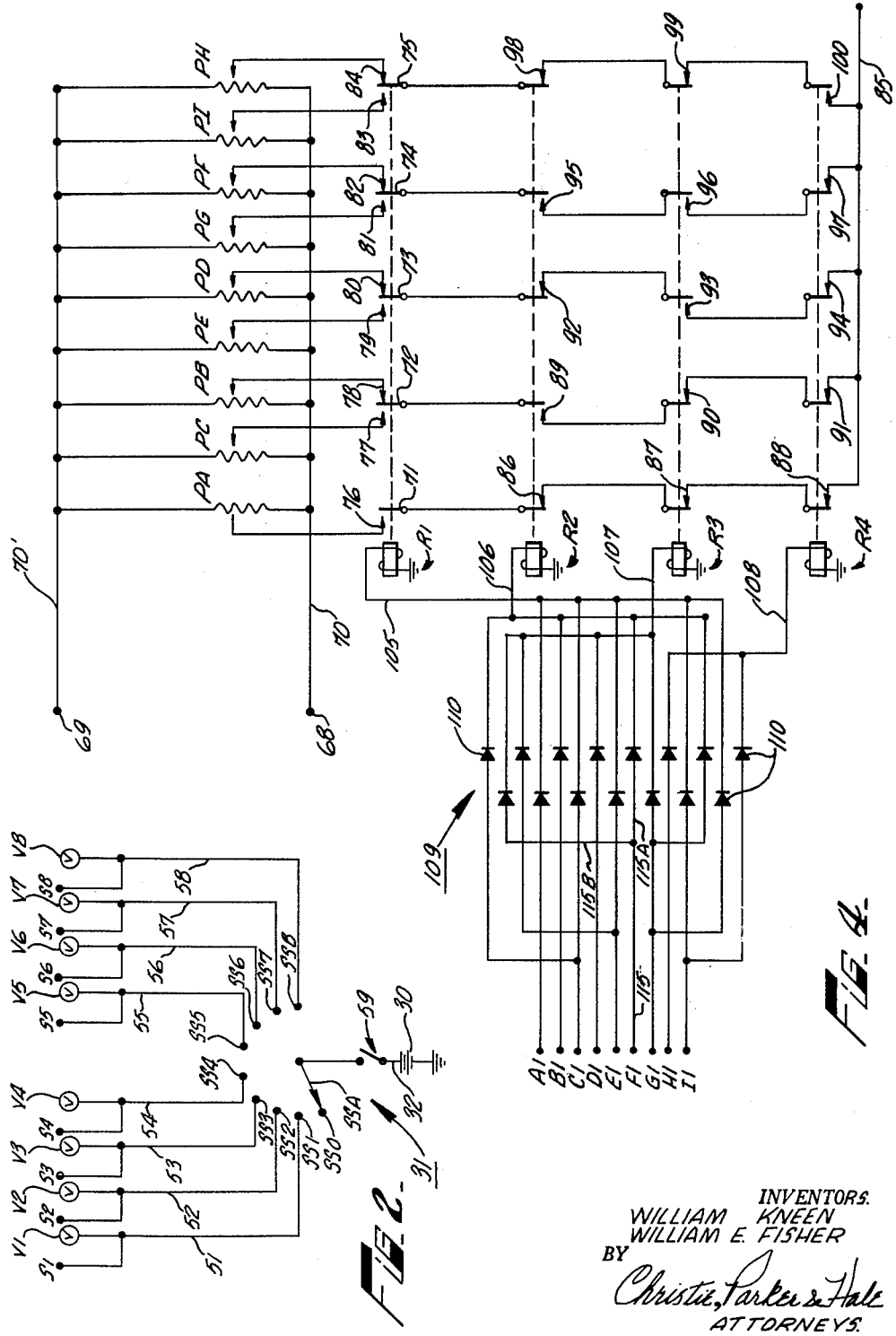
FIGURE 2 is a schematic diagram of a programmer for use in the system of FIGURE 1.

FIGURE 2 is a schematic diagram of an embodiment of the electrical potential source 30 and stream selector 31. The electrical potential source 30 is illustrated as a conventional battery. The stream selector 31 is shown as a rotary switch consisting of an armature SSA and nine contacts SS0, SS1, SS2, SS3, SS4, SS5, SS6, SS7 and SS8. The contact SS0 is the off position contact for the rotary switch. The contact SS1 is connected through a lead 51 to a stream on-off control valve V1, which corresponds to one of the on-off control valves 14, 15, and 16 of FIGURE 1. A lead S1 is joined to the lead 51. The contacts SS2, SS3, SS4, SS5, SS6, SS7, and SS8 similarly have leads 52, 53, 54, 55, 56, 57, and 58 connected thereto which are connected to on-off control valves V2, V3, V4, V5, V6, V7, and V8, respectively. The leads 52, 53, 54, 55, 56, 57, and 58 have conductors or leads S2, S3, S4, S5, S6, S7, and S8 joined thereto, respectively. The leads S1, S2, S3, S4, S5, S6, S7, and S8 correspond to the lead 36 of FIGURE 1.

When a particular stream is to be sampled, the armature SSA is rotated by the programmer 32 (not shown, see FIGURE 1) to contact the appropriate one of the contacts SS1, SS2, SS3, SS4, SS5, SS6, SS7, and SS8. For example, if stream five is to be sampled, the armature SSA is rotated to contact SS5, and the programmer then closes a switch 59, thus applying a positive potential to the lead 55 to actuate the on-off control valve V5 connected to the fifth sample stream (not shown). The positive potential is also applied to the lead S5, the purpose of which will be described with respect to FIGURE 3. Upon completion of the chromatographic separation, the switch 59 is opened by the programmer and the armature SSA then returned to the contact SS0, or to the appropriate one of the stream contacts to initiate another chromatographic separation.

Figure 3:
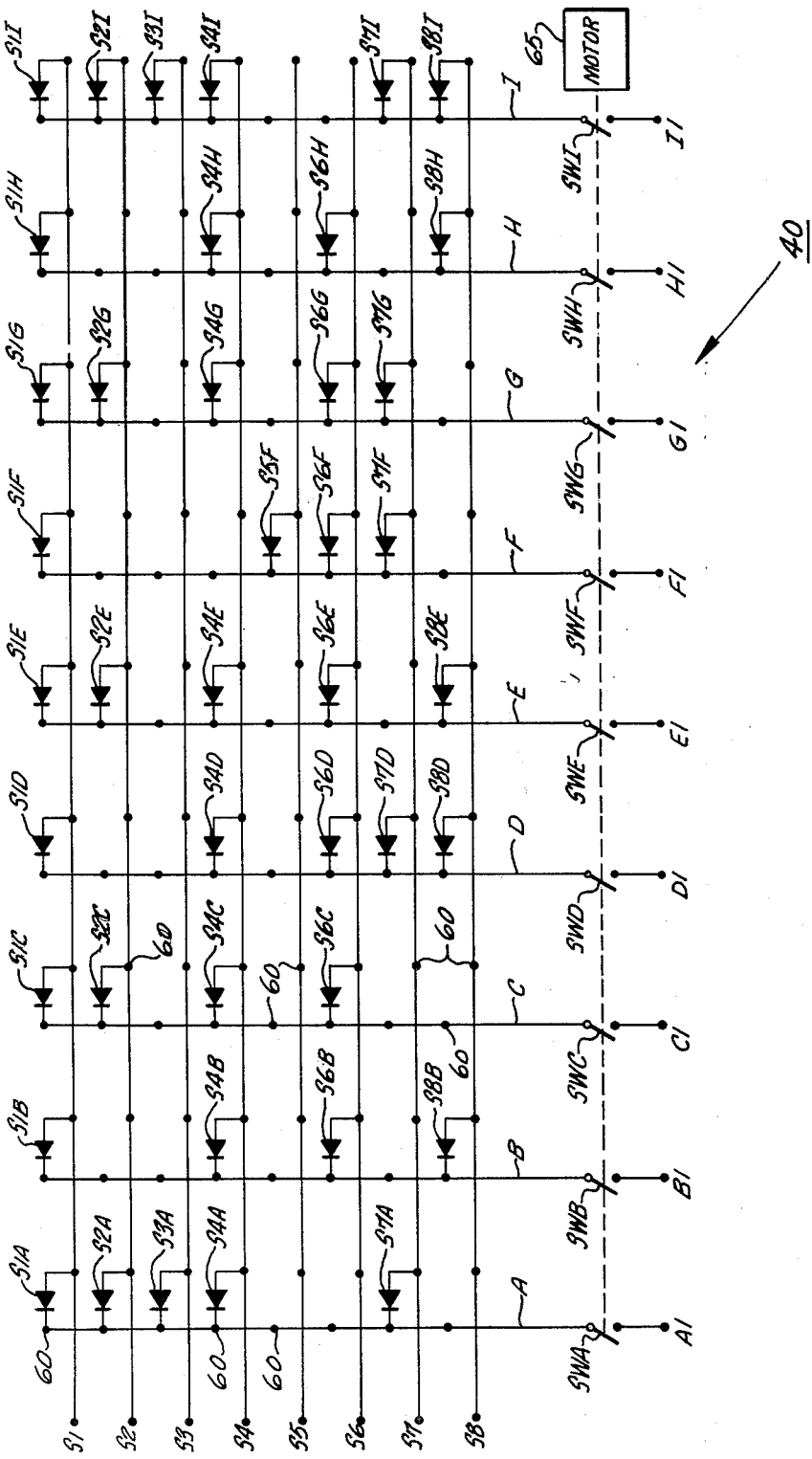
FIGURE 3 is a schematic diagram of a diode matrix and peak selector for use with the system of FIGURE 1.

FIGURE 3 is a schematic diagram of an embodiment of the diode control matrix 35, which consists of diodes arranged in a rectangular coordinate array. As shown in FIGURE 3, the leads S1, S2, S3, S4, S5, S6, S7, and S8 constitute the abscissa, and leads A, B, C, D, E, F, G, H, and I which correspond to the leads 37, 38, and 39 of FIGURE 1, constitute the ordinates, the abscissas and ordinates have junction points 60 therealong between which diodes are connected in a pre-selected array. The diodes are denominated by the ordinate and abscissa between which they are connected, for example, diode S1A connects the ordinate lead A to abscissa lead S1, and diode S8D connects the ordinate lead D and diode lead S8. Where no diode is connected between an ordinate and abscissa, the corresponding diode designation is omitted, as, for example, no diode is connected between ordinate C and abscissa S8, so that no diode S8C is shown in FIGURE 3. However, terminals 60 exist for connection of such a diode if desired, and it is to be understood that a diode can be connected between these two coordinates if appropriate.

The peak selector 40 consists of switches SWA, SWB, SWC, SWD, SWE, SWF, SWG, SWH, and SWI, connected on their armature sides of the ordinate leads A, B, C, D, E, F, G, H, and I, respectively, and on their contact sides to terminals A1, B1, C1, D1, E1, F1, G1, H1, and I1. A drive motor 65, together with camming means (not shown) functions to control the time and duration of closure of each of the switches SWA, SWB, SWC, SWD, SWE, SWF, SWG, SWH, and SWI. The drive motor 65 causes each of the switches SWA, SWB, SWC, SWD, SWE, SWF, SWG, SWH, and SWI to close and open in sequence, so that switch SWA closes and opens prior to the closure of switch SWB, and so on.

Recalling the example given with respect to FIGURE 2 as to the positioning of the armature SSA to contact SS5, so as to apply an electrical potential to lead S5, this potential is then applied by the lead S5 to the anode of the diode S5F, causing the diode to conduct, so that a positive potential is applied to the switch SWF. It will be noted that the diode S5F is the only diode connected to the abscissa lead S5. No electrical potential exists across the switches SWA, SWB, SWC, SWD, SWE, SWF, SWG, SWH, and SWI when open, and their closure does not alter the condition of the system since there are no diodes connecting the lead S5 to the leads A, B, C, D, E, F, G, H, or I. However the closure of switch SWF will complete the circuit from the lead F to its terminal F1, and the electrical potential which exists on the lead S5, which is applied to the lead F through the diode S5F, is then applied to the terminal F1.

In FIGURE 4, a schematic diagram of the variable attenuators is shown. The electrical signal output of the detector 26 (see FIGURE 1) is applied across the terminals 68 and 69 to which are connected a signal input lead 70 and a common lead 70', respectively. The variable attenuators include potentiometers PA, PB, PC, PD, PE, PF, PG, PH, and PI, which are associated with the leads A, B, C, D, E, F, G, H, and I, respectively, as will be explained, and relays R1, R2, R3, and R4. The potentiometers PA, PB, PC, PD, PE, PF, PG, PH, and PI are connected between the input lead 70 and the common lead 70'.

The relay R1 has armatures 71, 72, 73, 74, and 75 associated therewith. The armature 71 has a normally open contact 76. The armature 72 has a normally open contact 77 and a normally closed contact 78; the armature 73 has a normally open contact 79 and a normally closed contact 80; the armature 74 has a normally open contact 81 and a normally closed contact 82; and the armature 75 has a normally open contact 83 and a normally closed contact 84 associated therewith. The armature 71 is connected to a signal output lead 85 through normally closed contacts 86 of relay R2, normally closed contacts of 87 of relay R3, and normally closed contacts 88 of relay R4. The armature 72 is connected to the output lead 85 through normally open contacts 89 of relay R2, normally closed contacts 90 of relay R3 and normally closed contacts 91 of relay R4. The armature 73 is connected to the output lead 85 through normally closed contacts 92 of relay R2, normally open contacts 93 of relay R3 and normally closed contacts 94 of relay R4. The armature 74 is connected to the output lead 85 through normally open contacts 95 of relay R2, normally open contacts 96 of relay R3, and normally open contacts 97 of relay R4. The armature 75 is connected to the output lead 85 through normally closed contacts 98 of relay R2, normally closed contacts 99 of relay R3, and normally open contacts 100 of relay R4.

The relays R1, R2, R3, and R4 have energizing leads 105, 106, 107, and 108, respectively, which are connected to one end of an actuating network 109, which includes diodes 110, and individual leads connected to the terminals A1, B1, C1, D1, E1, F1, G1, H1, and I1. The diodes 110 are connected in each of the leads in the actuating network to prevent the back transfer of negative potentials applied to one of the terminals A1, B1, C1, D1, E1, F1, G1, H1, and I1 through the network interconnections.

Continuing with the previous example, a positive potential is applied to the terminal F1 from the matrix 35 (see FIGURE 3). A lead 115 is connected to the terminal F1 and has branches 115A and 115B connected to the energizing leads 106 and 107, respectively. The positive potential passes through the branches 115A and 115B and actuates the relays R2 and R3, opening contacts 86, 92, 98, 87, 90, and 99, and closing contacts 89, 95, 93, and 96. The detector signal applied between the terminal 68 and 69 passes through all of the potentiometers PA, PB, PC, PD, PE, PF, PG, PH, and PI and is present, in variously attenuated amplitudes, on each of the contacts 76 through 84. However, due to the actuation of relays R2 and R3, a path to the signal output lead 85 exists only between the contact 82, armature 74, now closed contacts 95 and 96, and contact 97. Thus the signal existing in the output lead 85 is attenuated in accordance with the setting of the potentiometer PF.

Thus it will be apparent that, by the application of an electrical potential to any one of the terminals A1, B1, C1, D1, E1, F1, G1, H1, or I1, the output of the corresponding attenuator potentiometer PA, PB, PC, PD, PE, PF, PG, PH, or PI is applied to the output lead 85 by means of the energization of the appropriate ones of the relay R1, R2, R3, or R4. While FIGURE 4 illustrates a system in which four relays are used in conjunction with an actuating network 109, it is to be understood that a separate relay can be utilized, if desired, for each of the leads connected to the terminals A1, B1, C1, D1, E1, F1, G1, H, or I1, in which case the contact arrangement shown in FIGURE 4 can be eliminated. However, as relays are comparatively expensive, the embodiment of FIGURE 4 provides a more economical system when a large number of streams are to be sampled.

It will be understood that the diodes illustrated in FIGURE 3 are positioned as appropriate in order to monitor particular components in particular streams. Thus stream S1, as shown in FIGURE 3, would have eight different monitoring intervals, during which the signals from the detector would be recorded. However, the stream S5 would only have one such interval. The various other streams have differing numbers of such intervals, corresponding to different components of interest in each particular stream. Such a system provides for great flexibility of operation, since the diode locations for a particular stream may be easily changed if the stream composition is changed. Similarly, the duration of monitoring for a particular component may be readily adjusted by changing the camming means utilized to actuate the appropriate one of the switches SWA, SWB, SWC, SWD, SWE, SWF, SWG, SWH, or SWI.

Further, while the matrix 40 has been shown as consisting of diodes, any appropriate switching system can be utilized in the matrix system. For example, each of the lines A, B, C, D, E, F, G, H, or I could have an electrical potential applied thereto, and a switching matrix be interposed between the point of application of the potential and the switches SWA, SWB, SWC, SWD, SWE, SWF, SWG, SWH, and SWI. The potentials applied to the terminals S1, S2, S3, S4, S5, S6, S7, and S8 would then be utilized to actuate the switching devices and the particular matrix abscissa. For instance, a transistor switch arrangement can be utilized. Thus, in its broadest application, the matrix is not limited to a diode matrix, but may consist of any appropriate control matrix system.

The invention claimed is:
1. A system for conducting chromatographic analyses comprising
  (a) a chromatographic column;
  (b) means for passing a stream of elutant through the column;
  (c) means for introducing a sample to be analyzed into the elutant stream entering the column;
  (d) a detector for receiving fluid emerging from the column, sensing the successive appearance therein of different components of the sample analyzed, and producing an electrical signal output in response thereto,
    (i) the magnitude of the peaks of which signal are functions of the quantities of the components of the sample analyzed;
  (e) a recorder;
  (f) a plurality of output channel means connected between the detector and the recorder by normally open output circuits, and
    (i) including means in each channel to attenuate the magnitude of an output signal applied thereto from the detector;
  (g) means for controlling sample introduction into the column;
  (h) a plurality of sample sources;
  (i) means connected between said programmer, said means for introducing a sample into the column, and said plurality of sample sources for sequentially introducing samples from said sources into said column;
  (j) a plurality of electrical conductors arranged in a rectangular array
    (i) such that a conductor in one coordinate of the array corresponds to one of said sample sources, and
    (ii) a conductor in the other coordinate of the array corresponds to one of said output channel means;
  (k) means connected between the programmer and the sample source coordinate conductors and operable to apply an electrical potential to that sample source coordinate conductor corresponding to the source from which a sample is being analyzed;
  (l) a plurality of diodes disposed in a rectangular coordinate array
    (i) such that each diode is connected between a sample source coordinate conductor and an output channel coordinate conductor at the crossing thereof to provide an electrical circuit therebetween;
  (m) means for normally opening said output channel coordinate conductors and for sequentially closing and opening said conductors during each analysis; and
  (n) output channel connecting means operable in response to the transfer by a diode of said electrical potential to any closed output channel coordinate conductor to close the normally open circuit connecting the output channel corresponding thereto between the detector and the recorder and to apply the attenuated output signal from the detector to the recorder.

2. A system according to claim 1 and in which
  (a) the attenuator means for each output channel has a potentiometer connected between the detector output and a common connection and the potentiometer arm is connected to the normally open output circuit; and
  (b) the output channel connecting means includes circuit actuator means connected to the output channel conductors and responsive to the application thereto of said electrical potential in one of said output channel conductors to close the normally open output circuit of the output channel to which said conductor corresponds.

3. A system according to claim 2 and in which
(a) the circuit actuator means includes
   (i) a plurality of multiple contact relays
     (ia) at least one of which is actuated upon the application to said circuit actuator means of said electrical potential; and
(b) each normally open output circuit includes
   (i) means connecting each output channel to one set of contacts in each of said relays.

References Cited in the file of this patent
UNITED STATES PATENTS

| | | |
|---|---|---|
| 2,757,541 | Watson et al. | Aug. 7, 1956 |
| 2,826,908 | Skarstrom | Mar. 8, 1958 |
| 2,875,606 | Robinson | Mar. 3, 1959 |
| 3,068,685 | Rogers | Dec. 18, 1962 |

OTHER REFERENCES

Brown et al.: Article in Proceedings of IRE, February 1949, pages 139–147.

Article: Gas Chromatography, published in Oil and Gas Journal, December 17, 1956, pages 138, 140.